United States Patent [19]

De Cenzo

[11] 4,150,847
[45] Apr. 24, 1979

[54] FLEXIBLE TUBE COUPLING WITH SYMMETRICAL ANCHOR RING

[76] Inventor: Herbert A. De Cenzo, 3719 Cannon Ave., Las Vegas, Nev. 89121

[21] Appl. No.: 872,305

[22] Filed: Jan. 25, 1978

Related U.S. Application Data

[63] Continuation-in-part of Ser. No. 692,651, Jun. 4, 1976, abandoned.

[51] Int. Cl.² ............................................. F16L 27/02
[52] U.S. Cl. .................................... 285/93; 285/233; 285/369; 285/388
[58] Field of Search ............... 285/233, 354, 388, 387, 285/386, 93, 369, 234, 261, 165

[56] References Cited

U.S. PATENT DOCUMENTS

| | | | |
|---|---|---|---|
| 2,212,745 | 8/1940 | McIntosh | 285/233 |
| 2,273,395 | 2/1942 | Couty | 285/354 X |
| 2,826,437 | 3/1958 | Detweiler et al. | 285/233 X |
| 3,174,778 | 3/1965 | Gross | 285/382.7 X |
| 3,223,438 | 12/1965 | De Cenzo | 285/233 |
| 3,405,957 | 10/1968 | Chakroff | 285/233 |
| 3,596,934 | 8/1971 | De Cenzo | 285/233 X |

FOREIGN PATENT DOCUMENTS

| | | | |
|---|---|---|---|
| 1274276 | 9/1961 | France | 285/354 |
| 493761 | 10/1938 | United Kingdom | 285/91 |

Primary Examiner—Thomas F. Callaghan
Attorney, Agent, or Firm—William H. Maxwell

[57] ABSTRACT

A coupling for thin-walled tubing, such as aircraft fuel lines, wherein a bearing ridge and O-Ring groove are preformed at the open tube end and wherein a coupling body, retaining nut and anchor ring are engageable over said bearing ridge and groove, the anchor ring being reversibly visible for inspection and in the form of an expansible doublesided buttress disengageably installed over the tube and combined with the retaining nut to abut the said bearing ridge and related to the coupling body so as to have anti-extrusion features with respect to the O-Ring seal subjected to internal fluid pressures.

26 Claims, 6 Drawing Figures

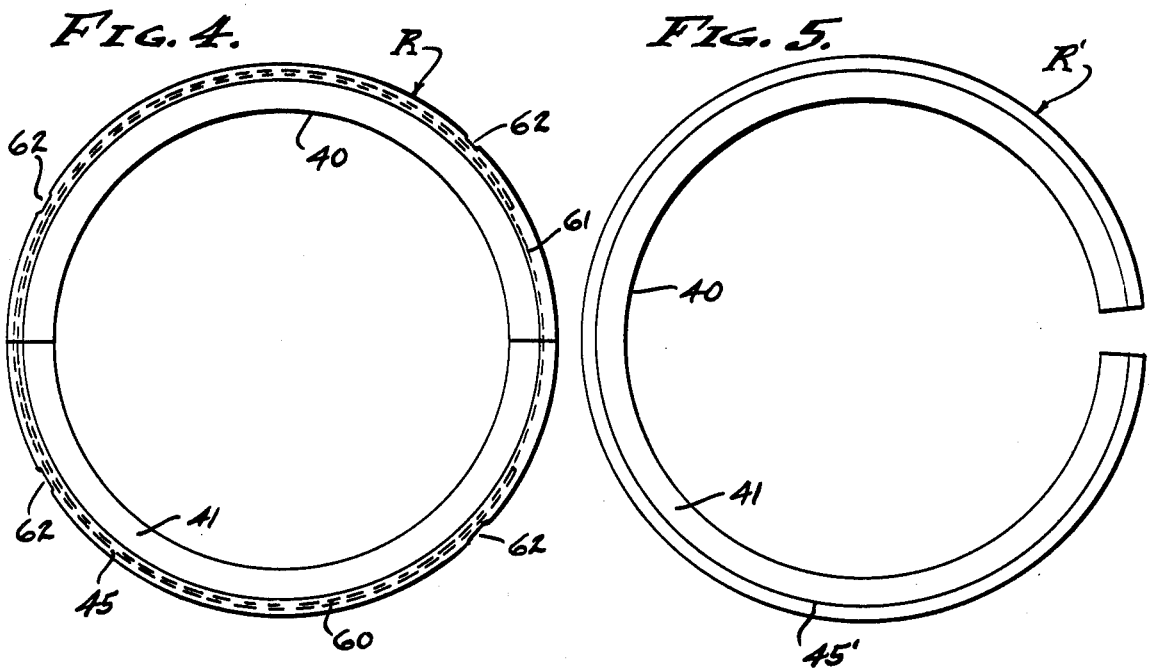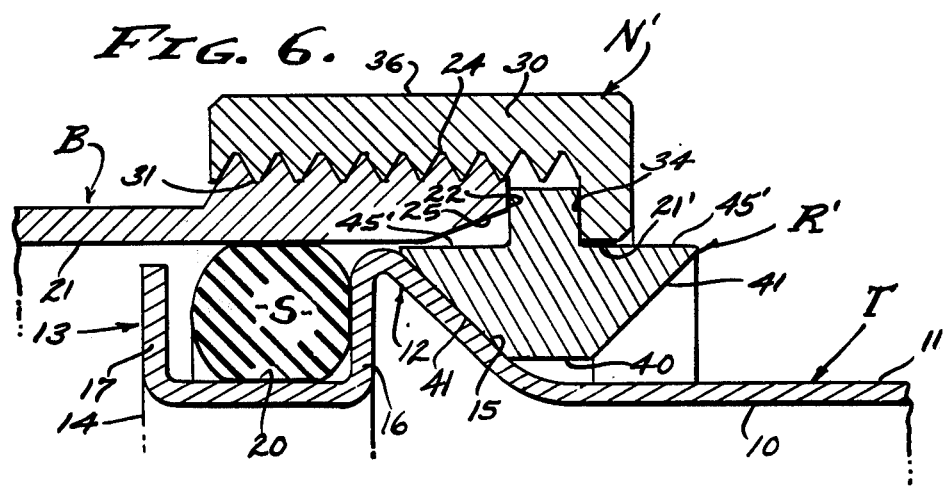

FLEXIBLE TUBE COUPLING WITH SYMMETRICAL ANCHOR RING

BACKGROUND

This is a continuation in part of application Ser. No. 692,651, filed June 4, 1976 and now abandoned on an improvement upon the *FLEXIBLE FLUIDTIGHT COUPLING FOR TUBES* as disclosed and claimed in my previous U.S. Pat. No. 3,596,934 issued Aug. 3, 1971, it being a general object of this invention to permit fabrication of formed tubing therefor without pre-assembly of the coupling parts therewith, and all of which is inspectable for completeness upon assembly.

With prior art couplings of the type under consideration a retaining nut has been pre-assembled over the tubing end before forming the tube with bearing and seal ridges. Characteristically, the prior art tube fabrication is comprised of non-replaceable retaining rings carried over the formed tubes as part of the coupling assembly, all of which is objectionable for the reason that tube forming and handling is hampered by the presence of the retaining rings, and for the fact that damaged retaining rings cannot be replaced. Consequently, it has been necessary to replace entire tube assemblies when damage to the coupling retaining ring occurs. As to fabrication of such tubes, it is desirable to account for such tubes separate and apart from the procurement of the various coupling configurations that are available. It is to this end, therefore, that I have provided a subsequently inspectable coupling configuration adapted to be assembled over preformed tubes, a coupling that is selectively applicable to such tubes, the coupling nut and ring being replaceable as circumstances require.

The presence of any part over a tube can be a hindrance, as for example when routing a tube during its installation where clearances are restrictive etc. Also, the bearing and seal ridges formed on the tube are to be minimized for the passage thereof through close fitting openings. Reference is made to thin-walled liquid transporting tubes as they are used in aircraft and the like, wherein the tubes are metallic or non-metallic members and preferably aluminum or soft metal tubular members that are subjected to structural deflection and thermal expansion and contraction under working conditions. The coupling of two or more liquid transporting tubular members must not only remain fluid tight under working conditions, but misalignments which involve axial, angular and longitudinal as well as rotational displacements must be accommodated. For example, the joinder of two inch (nominal) diameter tubular members can require axial displacements in all radial directions of 3/32 inch; can require angular displacements in all radial directions of 4° to 7°; can require longitudinal displacements in end to end directions of ⅜ inch; while requiring positioning in any selected rotative relation of one member to the other; and all of which requirements function alone or together as circumstances require and dynamically as conditions are imposed due to structure movements that subject the two members and intermediate coupling member to all variations of said requirements.

It is an object of this invention to provide a replaceable buttress retainer adapted to be assembled over the preformed end of a tube or the like. With the present invention the retaining nut has an inside diameter that exceeds the outside diameter of the bearing and seal ridges formed onto the end of the tube to be coupled. The retaining nut is then supplemented with the cooperative anchor ring of symmetrically split configuration to oppose the bearing ridges formed upon the tube. Accordingly, the retaining nut is slideably engageable over the formed tube end, and the anchor ring is expansibly engageable over the formed tube end and thereafter constrictable to determined diameters so as to fit within the retaining nut and closely to the outside tube diameter for buttress engagement with the bearing ridge formed thereon.

An object of this invention is to provide a tube coupling that involves the fewest number of parts, and which is subject to visual inspection for determining completeness. Only the O-Ring seals require inspection prior to final assembly, the presence of the anchor ring being visibly evident at all times. To this end, the anchor ring is symmetrically formed and proportioned so as to project from within the retaining nut to be visible, regardless of which way it is installed, and which assures that the assembly is complete by simple inspection. With this coupling configuration it is the combination of the nut and the presence of the ring which establishes the buttress that is threaded to the coupling body of cylinder form which embraces the formed tube ends being coupled. Thus, each coupling arrangement involves but three parts; body, nut and visible ring.

It is an object of this invention to prevent the extrusion of the O-Ring seal, by removing access of the O-Ring seal from the enlarged entrance annulus at the open end of the coupling body. The extrusion of O-Ring seals becomes a problem in couplings of the type under consideration when interior fluid pressures are increased, aggravated by the variable annulus between the bearing ridge and the internal end diameter of the coupling body. This annulus is augmented by the presence of an internal chamfer at the end of the coupling body and which is necessary as a "lead in angle" making it possible to slide the body over the O-Ring seal thereby compressing the same on assembly. This augmentation becomes gross as and when angular displacement of the tube occurs relative to the body, and to the end that extrusion of the seal is likely to occur as fluid pressure is applied. In the preferred form of this invention, the chamfered end of the body is occupied by either face of the anchor ring, as will be described.

SUMMARY OF INTENTION

A characteristic feature of the present invention is the split configuration of the symmetrical anchor ring, and with respect to singularity of this part the said ring is preferably maintained as one item, either by means of one point of severance or by means of assembly as will be described. Fundamentally, the anchor ring is split along its circumference at least at one point with the separated ends spaced or abutted in predetermined working position; a single split being feasible when size and flexibility permits the expansion necessary for assembly over the formed tube ends. However, when structural proportions and materials do not permit the aforesaid single split ring flexibility, then the ring is split along its circumference at a plurality of points, with separability of the segments that are peripherally opposed or abutted end to end when in working position. In this latter form, it is an object to secure the ring segments together as a unit, and preferably by means of a resilient clip permanently secured to the segments tied together thereby for the required expansible engagement over the formed tube ends.

Another characteristic feature of the present invention is the anti-extrusion configuration thereof, without destroying the O-Ring compression feature of the body. In practice, the O-Ring seals in this type of coupling are compressed 5 to 15% or more on assembly, depending for example on the temperature range requirements, said compression being effected by the "lead in angle" of an internal chamfer at the open end of the coupling body. This angle is generally accepted to be 20° and it augments the cylinder diameter at the seal flange that retains the O-Ring under pressure. With this invention, the lead in chamfer is retained and removed from the O-Ring engagement with the inner diameter wall of the coupling body, either by displacement from or by filling of the chamfer with the anchor buttress of the retaining nut combination, all as hereinafter described.

Still another characteristic feature of the present invention is the reversibility of the anchor ring, so that its assembly is foolproof in that the ring cannot be installed backward. The prior art assemblies must be carefully inspected in this respect in order to determine wrong or poor assemblies, whereas mere presence of this installed anchor ring is evidence of a correct and proper assembly, thereby eliminating all problems that could arise by not being a foolproof assembly. With the present invention, the anchor ring is symmetrical end for end, in that both end faces are alike or identical. Furthermore, the outer end of the anchor ring, however installed, is always visibly exposed between the nut and the tubing section being coupled thereby. It is the visible inspection of this anchor ring in position which ensures a complete installation.

DRAWINGS

The various objects and features of this invention will be fully understood from the following detailed description of the typical preferred forms and applications thereof, throughout which description reference is made to the accompanying drawings, in which:

FIG. 4 is a transverse view showing the anchor ring (constricted) which characterizes the present invention, removed from and separate from the assembly and taken as indicated by line 4—4 on FIG. 2.

FIG. 5 is a view similar to FIG. 4 showing a second form of anchor ring.

FIG. 6 is a view similar to FIG. 3 showing a second form of the invention.

PREFERRED EMBODIMENT

Figure 1:
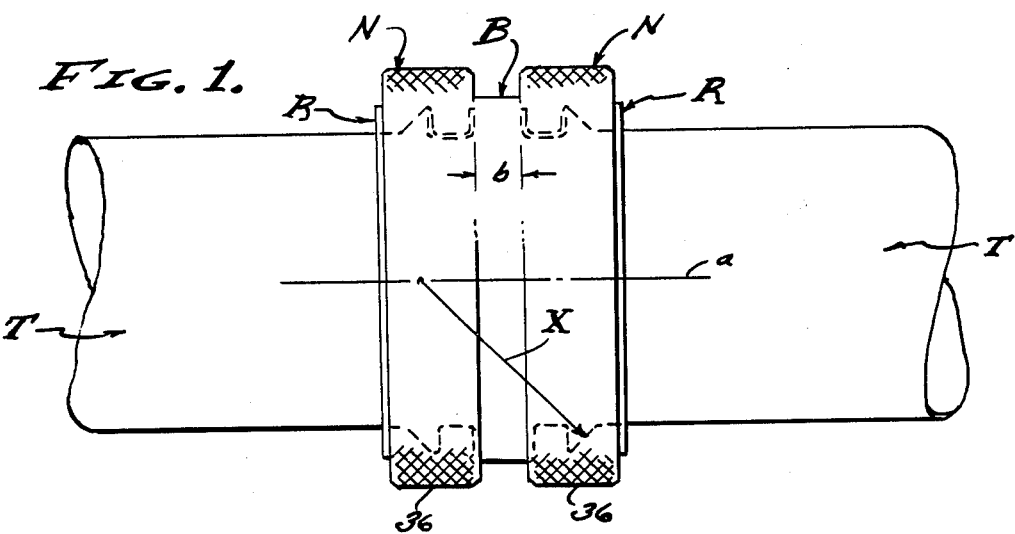
FIG. 1 is a longitudinal elevation of the tube and coupling assembly, showing the exposure of the anchor rings visibly embodied therein.

Referring to the drawings, I have provided a flexible fluid tight coupling for the terminal end portion of a tube T formed with a bearing ridge 12 and a sealing ridge 13. In accordance with this invention the coupling involves a body B, a retaining nut N and an anchor ring R, all of which are engageable over the formed end portion of the tube T, as will be described. It will be apparent that the coupling assembly accommodates all of those conditions required of couplings of the type under consideration, including axial, angular, longitudinal and rotative displacements whether static or moving.

The tube T to be connected is a cylindrical member having an inner diameter wall 10 and an outer diameter wall 11, the tubular body thereof being of thin-walled cross section, as shown. Although this invention can be practiced by fastening an end fitting onto the tube T, it is most advantageous and feasible with the present invention to form the bearing ridge 12 and sealing ridge 13 integrally of the end portion of said tube T. Accordingly, the inner and outer diameter walls 10 and 11 are reshaped at or in the end portion to establish the ridges 12 and 13, and to the end that the tubular member remains imperforate and leakproof. Although the tubular member or tube T can be made of various materials and by various methods, in practice a malleable material is utilized and which can be shaped and beaded, as shown, as by pressing, swagging, rolling, bending and/or spinning.

Figure 2:
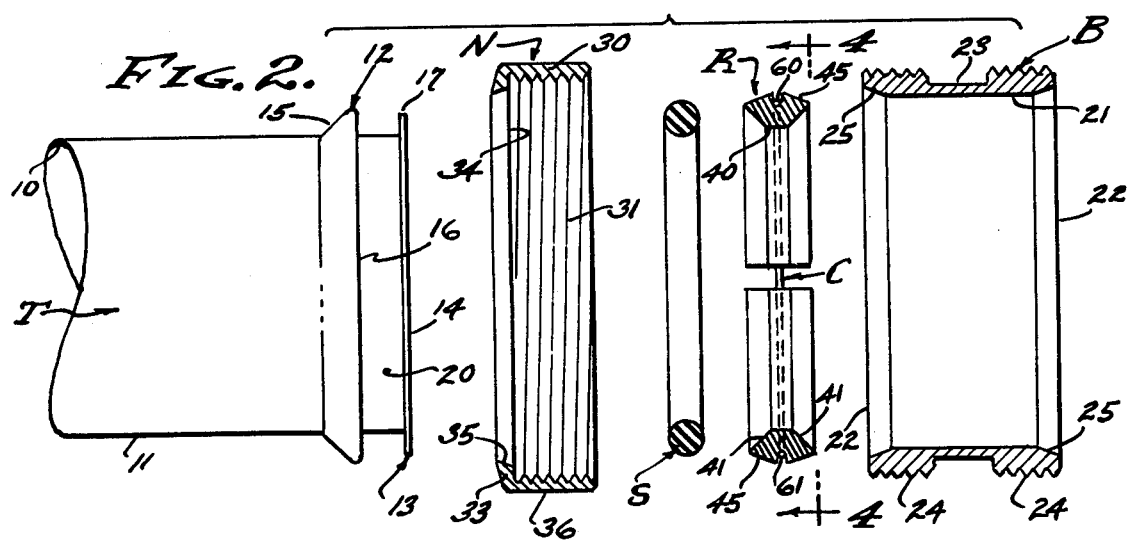
FIG. 2 is an exploded view of one of the tube ends and coupling members related thereto prior to the assembly shown in FIG. 1.

The bearing ridge 12 has its buttress-shaped shoulder 15 formed on or as a chord of a radius X of substantially larger dimension than the radius to the outer diameter wall 11 of the tube T. In carrying out the invention it is advantageous to expand the diameter of tube T when forming the ridges 12 and 13, so that there is no restriction within the tube, and the amount of expansion is determined by the radial extent of the seal per se, for example the cross section of the O-Ring S. Thus, this radial expansion limit has bearing upon the dimension of radius X (see FIG. 2) which is centered on the axis a beyond the end 14 of the tube T by the dimension b. Note that the dimension b (see FIG. 1) determines the maximum possible longitudinal displacement and determines the minimum dimension for radius X. In its theoretically perfect form the shoulder 15 is formed concentric with radius X and axis a establishing an inwardly faced bearing having a true spherical surface. However, in its practical form the shoulder 15 is on a straight chord of radius X, being of limited extent normal to said radius, and all of which is practical due to the shortness of said shoulder which renders the radius X dimension infinite in proportion thereto.

The sealing ridge 13 presents the terminal end 14 of the tube T while the bearing ridge 12 is inwardly adjacent thereto and spaced from the terminal end 14. The sealing ridge 13 formation is characteristically an annular flange 17 surrounding the terminal end portion of the tube, the end 14 being disposed in a plane normal to the central axis a of the tube, while the bearing ridge 12 is backed by a flange 16 spaced from and opposed to the said end flange 17. The aforesaid configuration provides a cylindrical seat 20, or channel, disposed between flanges for reception of the O-Ring seal S, the seat 20 and cooperating flanges 16 and 17 being in the configuration of a radially open channel or groove. In practice, the body of the tubular member T integrally forming the shoulder 15, flanges 16 and 17, and seat 20 is one continuous wall, as shown, employing suitable bend radii as circumstances require. The O-Ring seal S is pre-lubed and installed as shown, the seat 20 being of the same diameter as the outside of the tube T.

Figure 3:
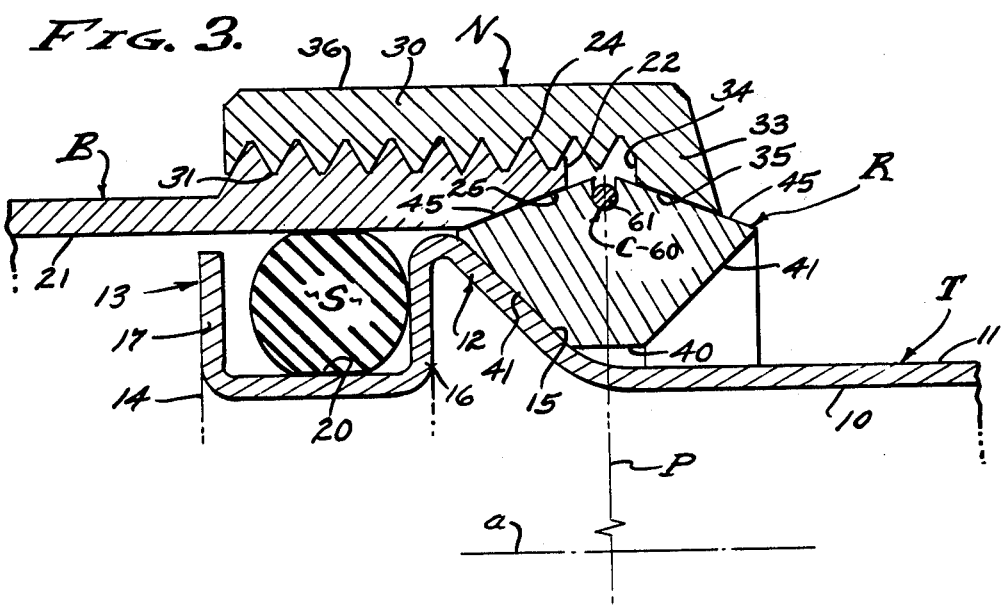
FIG. 3 is an enlarged fragmentary sectional view of a portion of the assembly shown in FIG. 1.

The body B of the coupling is a right cylinder with a smooth inner diameter bore 21 open at its end in a plane normal to its axis and receiving the ridges 12 and 13 with clearance for some movement of the tube T. In practice, the end face 22 of the body is in a plane substantially coincidental with the plane of flange 17, and the exterior diameter 23 of the body is threaded at 24 adjacent to said end face 22. Essential to freedom of the tube to shift and thereby accommodate misalignments, the terminal end 14 of the tube is spaced the distance b from the terminal end of a complementary tube, as shown, or equivalent base or fitting (not shown) to which the coupling is attached. In the preferred form shown, the apex of bearing ridge 12 and flange 16 is slightly greater in diameter than the diameter of shoulder 17, and the bore 21 and channel seat 20 spaced in order to provide for compression of the O-Ring seal on assembly. Compression of the O-Ring seal is facilitated by a chamfer 25 on which the anchor ring R is preferably seated (see FIG. 3) so as to completely occupy all interstices and thereby preclude outward extrusion of said seal. In practice, the chamfer 25 is 20° divergent, with an included angle of 40° for seating the anchor ring R. The bore 21 clears the bearing ridge with clearance, and the chamfer 25 extends from the bore 21 to an end face 22 normal to the axis of this cylindrical part.

The retaining nut N of the coupling is a counterbored sleeve 30 adapted to pass over the ridges 12 and 13 with clearance for assembly purposes. The sleeve 30 is counterbored and internally threaded at 31 so as to threadedly engage with the threads 24 on the body B, while its inner diameter clears the major diameter of the bearing ridge 12. In the preferred form as shown in FIGS. 1-4 the counterbore 31 terminates at an internal flange 33 that presents a face 34 to oppose the end face 22 of the body B. In this form the inner diameter of the flange is complementary to the above described internal chamfer 25 and presents an opposite internal chamfer 35, the faces 22 and 34 of the body and nut remaining spaced as shown so as to provide an annulus surrounding the outer diameter of the ring R. In accordance with this invention, the anchor ring R is simultaneously seated on the opposed chamfers 25 and 35 of the same configuration. Accordingly, the inner diameter of the flange 33 is the same as that of the body bore 21, and the chamfer 35 is 20° divergent with an included angle of 40° for seating the anchor ring R. As will be described the said preferred form of anchor ring R is constricted to its predetermined diameter by the opposed chamfers 25 and 35, and/or the second form of anchor ring R' as shown in FIG. 6 is confined in position between the opposed faces 22 and 34 and restricted to proper diameter by the body bore 21 and inner nut diameter 21'. The exterior or outer diameter 36 of the nut is knurled or otherwise provided with means to rotate the same into tight engagement upon the body with the anchor ring installed therein, next to be described.

The anchor ring R is a reversible split member preferably of a symmetrical diamond-shaped cross section that is disengageable over the tube T after the ridges 12 and 13 have been formed thereon, and to be received in the retaining nut N and constricted thereby to a predetermined working diameter that properly abuts the shoulder 15 on the tube T. In its preferred form as shown in FIGS. 1-4, the anchor ring R is symmetrical about a transverse plane P normal to the axis a of the assembly, and a feature of the ring is its symmetry about this plane P. Accordingly, in its installed condition the ring has an inner diameter 40 that comfortably clears the outer diameter wall 11 of the tube T, and which extends from the plane P to the shoulder 15 formed on tube T where it flares to have interface engagement at 41 conforming therewith. As shown, the inner diameters of the anchor ring R are identically formed at both its ends, namely at either side of the plane P.

In accordance with the preferred embodiment, the outer diameters of the anchor ring R are externally chamfered at 45 to simultaneously engage with the internal chamfers 25 and 35, and accordingly the ring has oppositely convergent chamfers 45 extended axially from the plane P in cone formation from a common base diameter. As is shown, each chamfer 45 is a frustum of a cone converging to have interface engagement with the internal chamfers 25 and 35 at opposite ends of the anchor ring R, and intersecting the flares 41 respectively within the clearance diameters between the ridges 12 and body bore 21. As shown, the outer diameters of the anchor ring R are identically formed at both its ends, namely at either side of the plane P.

It will be seen from the foregoing that the anchor ring R is of a symmetrical diamond-shaped cross section, and thereby reversibly received within the grip of the complementary inner chamfers 25 and 35 of the body B and nut N. In accordance with this invention, provision is made for coupling the assembly over the preformed tube or tubes T, and accordingly the split configuration of the anchor ring R is provided for predetermined or restricted constriction onto the tube shoulder 15. That is, the ring is symmetrical, the segments thereof being abutted, as shown in FIGS. 4 and 5, so that constriction is to a determined diameter.

In accordance with the invention, the segments of the anchor ring R are joined by an arcuate clip C fastened thereto with the segments juxtapositioned in circumferential sequence ready for use. The clip C is a resilient element 60 of arcuate form fitted into a groove 61 at the exterior of the anchor ring, and staked in position at points 62 spaced from the split ends of the segments so as to permit flexure of the clip. Thus, the segments are flexibly joined together as a unit for facility in expanding them over the formed tube end, and for facilitating contraction for insertion into the retaining nut N and combined therewith as a buttress engageable with the bearing ridge 12.

A feature of the anchor ring R is its symmetry and the accommodation of clip C within the aforementioned annulus between the faces 22 and 34 of the body B and nut N respectively. As shown, the clip C is disposed to lie circumferentially of the ring R and in the plane P of symmetry, the groove 61 being formed in the outer periphery of the ring segments with the staking 62 confined to the said annular space provided especially therefor. Upon assembly, the 20° chamfered engagement applied symmetrically between the body B and nut N jambs the anchor ring into aligned position and to the restricted diameter, fully occupying the chamfer 25 and thereby eliminating any interstices so as to preclude extrusion of the O-Ring when under extreme pressure.

Referring now to the symmetrical anchor ring R' of FIG. 6 of the drawings, there is a frustum of a cylinder 45' in place of a cone, the cylinder extensions 45' being positionably engaged within the inner diameter bores 21 and 21' respectively. The symmetrical positioning of the anchor ring R' is then ensured by a radial flange 45 that occupies the space between the faces 22 and 34 of the body B and nut N to be positively clamped therebetween, as shown. This anchor ring R' is to be used where chamfer 35 is not provided on the nut N'.

From the foregoing it will be seen that I have provided a coupling wherein the retaining nut and its buttress are replaceable on the tube permanently formed with bearing and sealing ridges. It is a feature of this invention that the retaining nut N is combined with a symmetrical anchor ring R (R') to form a replaceable buttress; that the anchor ring is characteristically reversible and expansible and that it has predetermined constricted dimensions. It is the combination of the retaining nut N and reversible anchor ring R (R') expansible from its determinably constricted condition that permits engagement over the tube end with enlarged ridges applied prior to the subassembly of the retaining nut N and anchor ring R (R'). In order to avoid complexity in hinging segments of the anchor ring R, and in order to avoid loose ring segments, the resilient clip element 60 is provided in the form of a semi-circular wire, stainless piano wire or the like; an inexpensive means of flexibly coupling the anchor ring segments together as a unit of the combination. The coupling body R is then engaged over the O-Ring seal carried in the channel formed by flanges 16 and 17, to compress the same by virtue of the inside taper or chamfer 25. Complete coupled engagement is then attained by running the retaining nut N onto the body B and over the anchor ring R which covers the internal exposure of chamfer 25 and/or occupies the same so that it is eliminated from exposure to the O-Ring seal. The anchor ring R or R' is indiscriminately reversible with one of its conical chamfers 45 or cylinders 45' extended substantially beyond the flange 30 to visibly project therefrom for inspection. Therefore, a visual inspection is assurance that the assembly is structurally complete, and the tightness evidenced by said projection for assurance of proper alignment. Consequently, a non-extruding O-Ring seal is provided in a coupling wherein all parts and elements are replaceable, permitting the tube to be independently fabricated as a separate unit item.

Having described only typical preferred forms and applications of my invention, I do not wish to be limited or restricted to the specific details herein set forth, but wish to reserve to myself any modifications or variations that may appear to those skilled in the art.

I claim:

1. A flexible fluid conducting coupling for a preformed cylindrical tube end enlarged radially with a peripheral bearing ridge having a shoulder faced away from the tube end and spaced from an end flange by a seat to form an intermediate seal groove; and including, a seal carried in the seal groove, a retaining nut having an inturned flange engageable with clearance over the said end flange and bearing ridge of the tube and having a counterbore terminating at a face of said inturned flange and disposed toward the end of the tube and in spaced relation to and opposing the bearing ridge thereon, a split anchor ring expansible to engage over the said end flange and bearing ridge of the tube and movable through the counterbore into engagement with the face of said inturned flange of the nut and having a wall forming a buttress engageable with the shoulder of the bearing ridge, and a fluid conducting cylindrical coupling body engageable with clearance over the said end flange and bearing ridge of the tube and positioned in the counterbore of the retaining nut and having an end face opposed to the face of said flange of the retaining nut and positionably clamping the anchor ring therebetween.

2. The tube end coupling as set forth in claim 1, wherein the counterbore of the retaining nut and outer diameter of the coupling are threadedly secured and the split anchor ring rigidly clamped between the face of the flange and end face of the coupling body.

3. The tube end coupling as set forth in claim 1, wherein the split anchor ring has circumferential engagement within the retaining nut constricting the same to determined diameters.

4. The tube end coupling as set forth in claim 1, wherein the split anchor ring is comprised of a resiliently expansible segment with abutted ends limiting constriction thereof to determined diameters.

5. The tube end coupling as set forth in claim 1, wherein the split anchor ring is comprised of segments joined by an arcuate spring clip and with abutted ends limiting constriction thereof to determined diameters.

6. The tube end coupling as set forth in claim 1, wherein the split anchor ring is segmented and externally channeled to expand between the opposed faces of the retaining nut and coupling body respectively and joined by an arcuate spring clip fitted into said segment channels.

7. The tube end coupling as set forth in claim 1, wherein the split anchor ring is comprised of at least one segment projecting from the inturned flange of and to the exterior of the retaining nut and thereby visibly exposed for its position and presence by inspection.

8. The tube end coupling as set forth in claim 1, wherein the split anchor ring is segmented and externally channeled to expand between the opposed faces of the retaining nut and coupling body respectively and with means limiting the constriction thereof to determined diameters and joined by an arcuate spring clip fitted into said segment channels, and wherein the counterbore of the retaining nut and outer diameter of the coupling body are threadedly secured and the split anchor ring clamped between the face of the flange and end face of the coupling body.

9. A flexible fluid conducting coupling for a preformed cylindrical tube end enlarged radially with a peripheral bearing ridge having a conical shoulder faced away from the tube end and spaced from an end flange by a seat to form an intermediate seal groove; and including, a radially compressible seal carried in the seal groove, a retaining nut having an inturned flange engageable with clearance over the said end flange and bearing ridge of the tube and having a counterbore terminating at said inturned flange and having a chamfered inner bore divergently disposed toward the end of the tube and in spaced relation to and opposing the bearing ridge thereon, a reversible split anchor ring formed symmetrically about a plane normal to the center axis of the tube and expansible to engage over the said end flange and bearing ridge of the tube and movable through the counterbore of the retaining nut and having identically chamfered outer faces at opposite sides of said plane of symmetry and one of which is complementary to and engageable in the divergently chamfered inner bore of the retaining nut flange and having oppositely faced identically conical inner walls forming buttresses complementary to and alternately engageable with the conical shoulder of the bearing ridge, and a fluid conducting cylindrical coupling body engageable with clearance over the said end flange and bearing ridge of the tube and positioned in the counterbore of the retaining nut and having a chamfered inner bore identical to and divergently disposed toward the chamfered inner bore of the retaining nut flange and complementary to and engageable with the other one of said identically chamfered outer faces of the anchor ring and positionably clamping the anchor ring.

10. The tube end coupling as set forth in claim 9, wherein either one of said identically chamfered outer faces of the reversible split anchor ring fully occupies the chamfer of the inner bore of the coupling body thereby to eliminate interstices therebetween.

11. The tube end coupling as set forth in claim 9, wherein the counterbore of the retaining nut and outer diameter of the coupling are threadedly secured and the split anchor ring reversibly clamped between the chamfered inner bore of the retaining nut flange and chamfered inner bore of the coupling body.

12. The tube end coupling as set forth in claim 9, wherein the split anchor ring has circumferential engagement within the retaining nut constricting the same to determined diameters.

13. The tube end coupling as set forth in claim 9, wherein the split anchor ring is comprised of resiliently expansible segment with abutted ends limiting constriction thereof to determined diameters.

14. The tube end coupling as set forth in claim 9, wherein the split anchor ring is comprised of segments joined by an arcuate spring clip and with abutted ends limiting constriction thereof to determined diameters.

15. The tube end coupling as set forth in claim 9, wherein the split anchor ring is segmented and externally channeled to expand between the opposed faces of the retaining nut and coupling body respectively and joined by an arcuate spring clip fitted into said segment channels.

16. The tube end coupling as set forth in claim 9, wherein the split anchor ring is comprised of at least one segment projecting from the inturned flange of and to the exterior of the retaining nut and thereby visibly exposed for its position and presence by inspection.

17. The tube end coupling as set forth in claim 9, wherein the split anchor ring is segmented and externally channeled to expand between the opposed faces of the retaining nut and coupling body respectively and with means limiting the constriction thereof to determined diameters and joined by an arcuate spring clip fitted into said segment channels, and wherein the counterbore of the retaining nut and outer diameter of the coupling body are threadedly secured and the split anchor ring reversibly clamped between the chamfered inner bore of the retaining nut flange and chamfered inner bore of the coupling body.

18. A flexible fluid conducting coupling for a preformed cylindrical tube end enlarged radially with a peripheral bearing ridge having a conical shoulder faced away from the tube end and spaced from an end flange by a seat to form an intermediate seal groove; and including, a radially compressible seal carried in the seal groove, a retaining nut having an inturned flange engageable with clearance over the said end flange and bearing ridge of the tube and having a counterbore terminating at said inturned flange and having a cylindrical inner bore and having a face disposed toward the end of the tube and in spaced relation to and opposing the bearing ridge thereon, a reversible split anchor ring formed symmetrically about a plane normal to the center axis of the tube and expansible to engage over the said end flange and bearing ridge of the tube and movable through the counterbore of the retaining nut and having identical cylinder members projecting from opposite faces of a peripheral flange in the said plane of symmetry and either of which is engageable in the cylindrical inner bore of the retaining nut flange and having oppositely faced identically conical inner walls forming buttresses complementary to and alternately engageable with the conical shoulder of the bearing ridge, and a fluid conducting cylindrical coupling body engageable with clearance over the said end flange and bearing ridge of the tube and positioned in the counterbore of the retaining nut and having a chamfered inner bore to compress the seal, the peripheral flange of the anchor ring being positionably clamped between the face of the retaining nut flange and the end face of the coupling body.

19. The tube end coupling as set forth in claim 18, wherein either one of said identical cylinder members of the anchor ring fully covers the chamfer of the inner bore of the coupling body thereby to eliminate interstices therebetween.

20. The tube end coupling as set forth in claim 18, wherein the counterbore of the retaining nut and outer diameter of the coupling are threadedly secured and the split anchor ring reversibly clamped between the face of the inturned flange and end face of the coupling body.

21. The tube end coupling as set forth in claim 18, wherein the split anchor ring has circumferential engagement within the retaining nut constricting the same to determined diameters.

22. The tube end coupling as set forth in claim 18, wherein the split anchor ring is comprised of a resiliently expansible segment with abutted ends limiting constriction thereof to determined diameters.

23. The tube end coupling as set forth in claim 18, wherein the split anchor ring is comprised of segments joined by an arcuate spring clip and with abutted ends limiting constriction thereof to determined diameters.

24. The tube end coupling as set forth in claim 18, wherein the split anchor ring is segmented and externally channeled to expand between the opposed faces of the retaining nut and coupling body respectively and joined by an arcuate spring clip fitted into said segment channels.

25. The tube end coupling as set forth in claim 18, wherein the split anchor ring is comprised of at least one segment projecting from the inturned flange of and to the exterior of the retaining nut and thereby visibly exposed for its position and presence by inspection.

26. The tube end coupling as set forth in claim 18, wherein the split anchor ring is segmented and externally channeled to expand between the opposed faces of the retaining nut and coupling body respectively and with means limiting the constriction thereof to be determined diameters and joined by an arcuate spring clip fitted into said segment channels, and wherein the counterbore of the retaining nut and outer diameter of the coupling body are threadedly secured and the split anchor ring reversibly clamped between the face of the inturned flange and end face of the coupling body.

* * * * *